April 29, 1969    A. B. DE LA BRETONIERE    3,441,702

METHOD AND APPARATUS FOR HEATING THREAD-LIKE PRODUCTS

Filed April 25, 1967    Sheet 1 of 2

*INVENTOR*
ANDRE BENOIT DE LA BRETONIERE

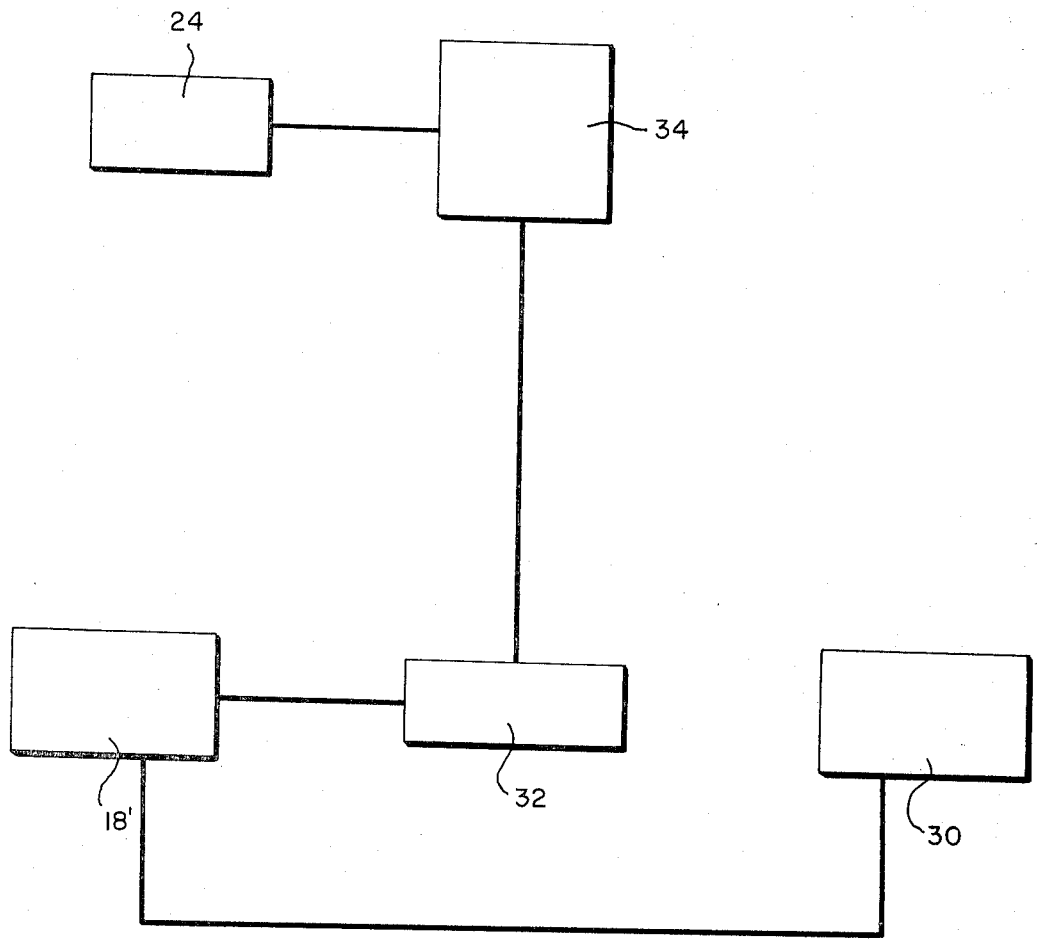

United States Patent Office 3,441,702
Patented Apr. 29, 1969

3,441,702
METHOD AND APPARATUS FOR HEATING THREAD-LIKE PRODUCTS
Andre Benoit de la Bretoniere, Oosterbeek, Gelderland, Netherlands, assignor to American Enka Corporation, Enka, N.C., a corporation of Delaware
Filed Apr. 25, 1967, Ser. No. 633,465
Claims priority, application Netherlands, Apr. 30, 1966, 6605877
Int. Cl. H05b 9/06
U.S. Cl. 219—10.61                    14 Claims

ABSTRACT OF THE DISCLOSURE

An improved method of heating a continuously advancing thread-like product wherein the product is wrapped at least one turn around the heated casing of a transport roller, the casing being heated by the heat evolved therein when a metal portion of the casing is moved through a magnetic field, the method including the steps of producing a rotating magnetic field, inducing electric currents in the casing and forcing the induced currents to flow along orderly directed current paths therein.

---

This invention relates to an improved method and apparatus for heating a continuously advancing thread-like product which is wrapped one or more turns around a heated shell or casing of a transport roller, the shell of the roller being heated by the heat evolved when a metal portion of the shell is moved through a magnetic field, thereby cutting the magnetic lines of force in that field. A method and an apparatus of this type are disclosed in the Netherlands patent specification No. 104,925.

In the method described in the Netherlands Patent Specification, the heat produced may be due to hysteresis losses or eddy current losses or a combination of both.

When the roller shell is made of a good magnetic, but poor electric conductor, then the heat losses will be substantially due to magnetic hysteresis. When, however, the roller shell consists of a non-magnetic material which is a good electric conductor, then the roller will be heated by the eddy currents induced therein. Finally, when the roller shell is both a good magnetic and electric conductor or consists of a portion having good magnetic conductivity and a portion having good electric conductivity, then the roller shell is heated due to both hysteresis and eddy current losses.

The method described in the above-mentioned patent may be utilized in a draw-twisting machine for the hot-drawing of thread-like polymerization or polycondensation products. By thread-like products is meant yarns, tapes, ribbons, foils and the like.

Although the known method and apparatus have the advantage that the heat produced is at least substantially evolved in the desired place and that a satisfactory heat transfer may be obtained, the measurement and the control of the developed heat meets with practical difficulties. To this end, it is necessary that a temperature sensitive element be embedded in the roller wall, for example, a thermistor which is connected through slip rings and brushes. This construction may lead to defects, especially in an atmosphere which is likely to give rise to fouling as a result of dust particles and fiber pieces.

In accordance with this invention a particularly satisfactory measure of the heat energy evolved in the roller shell can be obtained without the use of slip rings thereby avoiding many of the problems of the known method and apparatus.

Thus, this invention contemplates a method for heating thread-like products, e.g., threads, tapes, ribbons, foils and the like in which the product is wrapped around a roller shell or casing heated by a rotating magnetic field which induces in the roller shell electric currents that are, substantially, forced to flow along orderly directed current paths.

By orderly directed current paths is to be understood here that the currents flow in one or more definite directions. For instance, in an electric conductor whose cross-sectional dimensions are small relative to its length, the electric current will flow substantially along the longitudinal axis of the conductor. Randomly directed current paths, however, are found when electric currents flow in often difficultly definable directions, as is the case with eddy currents.

The invention also contemplates a transport roller for continuously advancing and heating a thread-like product, comprising a current inducing means capable of producing a rotating magnetic field and a product supporting shell or casing against which the product to be heated is laid, said casing being spaced around and separated from the inducing means by an air gap, being so constructed that heat is evolved therein under the influence of the active rotating magnetic field and containing material having a good magnetic conductivity and non-magnetic material having electric conductivity.

By the active rotating magnetic field is to be understood the part of the rotating field that contributes to the evolution of heat in the roller shell or casing.

The transport roller of this invention is further characterized in that the non-magnetic material having electric conductivity is provided in the form of rod-shaped electric conductors arranged around the inducing means, and which are at least partially surrounded by the material having good magnetic conductivity and form part of short-circuited current or shunted circuits.

It is preferred to use a construction for the transport roller in which at the inner surface of the roller casing there are provided substantially axially extending rod-shaped electric conductors.

A suitable embodiment in which the conductors are combined to form short-circuited circuits comprises short-circuiting rings through which the rod-shaped electric conductors are inter-connected at their ends.

If it is undesirable for the rotating magnetic field to impose a relatively large mechanical moment on the roller shell it is preferred that the geometrical axes of the rod-shaped electric conductors lie on two co-axial cylindrical surfaces and are two by two combined to form short-circuited current circuits which lie in planes that pass through the axis of the transport roller.

Although with this embodiment currents are induced in the short-circuited current circuits thus formed, the resultant moment forces imposed on these circuits are only relatively small.

In order to ensure that a largest possible part of the heat evolved in the roller shell is produced in the rods, it is preferred that the material having good magnetic conductivity is provided in the form of a pack of ring-shaped dynamo laminations which are insulated from each other. In this way both the hysteresis and the eddy current losses in the magnetic material can be kept very small. This contributes to the strength of the currents induced in the conductors forming a reliable measure of the total amount of heat developed.

It is further preferred that means are provided for varying the strength of the active rotating magnetic field. Construction suitable for this purpose is characterized in that a magnetic shunt is provided for varying the strength of the active magnetic rotating field.

A suitable construction of the transport roller is characterized in that the inducing means is formed by a polyphase winding. For this purpose use may be made of the internal stator of a polyphase induction motor which is known per se.

The roller is further characterized in that the voltage applied to the polyphase winding is variable.

Another feature of the invention is characterized in that the frequency of the voltage applied to the polyphase winding is variable.

A suitable embodiment of the transport roller is further characterized in that at least one fixedly mounted current pick up is provided for supplying a signal representing the strength of the current induced in the electric rod-shaped conductors.

The output signal of this current pick up may now serve as a measure of the heat developed.

As current pick up, use may be made advantageously of a measuring coil which surrounds part of the magnetic flux that is set up by the currents flowing through the short-circuited current circuits.

If it is assumed that the ambient temperature is subject to only small variations it is preferred to provide an automatic control loop for controlling the temperature of the roller shell. In the control loop the pick up of the controlled quantity is formed by the current pick up and the correcting quantity is formed by the strength and/or the angular velocity of the active rotating magnetic field.

In order to obtain a constant roller shell temperature the control loop may ensure that currents of corresponding strength are induced in the conductors.

The invention will be further described with reference to the embodiments shown in the accompanying drawing in which:

FIGURE 4 is a schematic block diagram showing the apparatus for supplying a polyphase current to the transport roller and for controlling the heat evolved therein.

Figure 1:
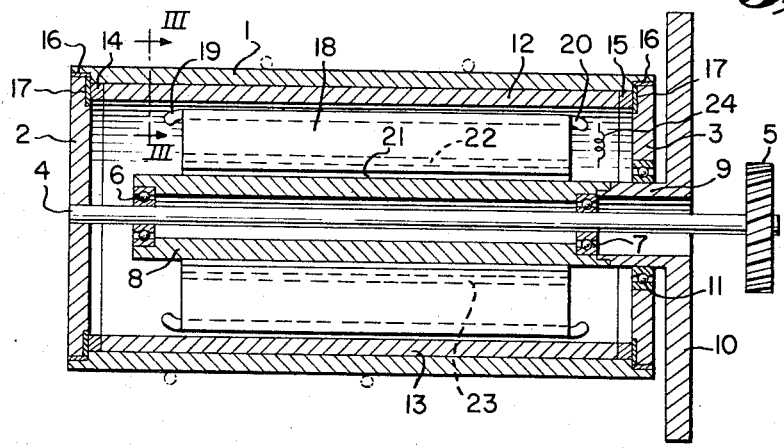
FIGURES 1 and 2 show two different embodiments of a transport roller according to the invention.

Referring to the drawings, wherein like elements are designated by like reference numbers, FIGURE 1 shows the construction of a transport roller which is used for the hot-drawing of a thread-like product. The transport roller may be used, for instance, for the hot-drawing on drawtwisting machines or drawing machines of synthetic products such as polyamides or polyesters. Hereinafter, the transport roller may be considered as being used for the drawing and heating of a synthetic thread. In this arrangement the thread passes through a drawing zone in which it is drawn to several times its original length. The drawing zone is bounded by one or more feed rollers and a draw roller. The feed rollers advance the thread into the drawing zone from which the thread leaves via the draw roller. The draw ratio is governed by the ratio between the circumferential speeds of the feed rollers and the circumferential speed of the draw roller. The thread (as shown by dash-dot lines) is wrapped a few times around a roller shell or casing having good thermal and magnetic conductivity, which may be formed by a tube of solid steel. Alternatively, the roller shell may be formed by dynamo laminations which are insulated from each other and formed into a cylindical pack.

At its ends the roller shell or casing 1 is supported by disks 2 and 3. The disk 2 is mounted on a driving shaft 4 on which there is positioned a gear wheel 5 through which the roller shell 1 may be rotated. The driving shaft 4 is freely rotatably supported by two ball bearings 6 and 7 which are, respectively, housed in a bushing 8. The bushing 8 is attached to the collar 9 of a flange 10 by which the transport roller may be secured to a machine frame (not shown). On the collar 9 there is provided a ball bearing 11 which supports the right hand end of the roller shell with the disk 3 so that it can freely rotate. Provided in the inner surface of the roller shell are a plurality of axially extending grooves containing rod-shaped electric conductors. The conductors may be of copper or aluminum or some other material, from which a conductor of suitable resistance may be formed. These conductors are surrounded, at least around part of their exterior surface, by the magnetically-conducting material of the roller shell 1.

Figure 2:
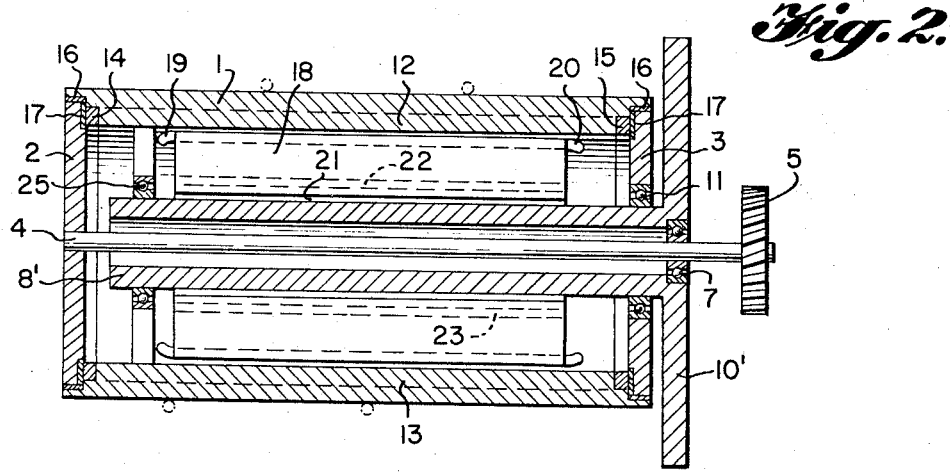

In FIGURES 1 and 2 two of these conductors are referred to by reference numerals 12 and 13, respectively. At their ends the conductors are inter-connected by electrical-conducting short-circuiting rings 14 and 15. The reference numerals 16 and 17 designate the insulating material used to prevent the loss of heat from the roller surface via the disks 2 and 3. Inside the roller shell 1 and around the bushing 8 there is positioned a stator 18 provided with a three-phase winding corresponding to the construction of an internal stator of a polyphase induction motor. Reference numerals 19 and 20 designate the schematically represented coil heads of the three-phase winding.

The stator 18, which is separated from the bushing 8 by a thermally non-conductive intermediate layer 21, has a number of axially extending cooling channels, two of which are schematically shown and referred to by the reference numerals 22 and 23.

The transport roller is heated as follows: When the three-phase winding of stator 18, which forms the inducing portion of the apparatus, is connected to a three-phase source of a given voltage and frequency, a rotating magnetic field is set up which induces electrical currents in the rod-shaped conductors in the roller shell. Since the conductors form short-circuited circuits, electric currents are induced therein which give rise to the evolution of heat. The amount of heat developed is governed, inter alia, by the strength of the active rotating magnetic stator field and the difference between the angular velocity of the rotating stator field and that of the roller shell. The angular velocity of the rotating stator field is dependent on the number of poles and the frequency of the three-phase source. It will be appreciated that the angular velocity of the roller shell is determined by the angular velocity of the driving shaft 4.

The heat developed in the conductors flows via the thermally and magnetically conducting part of the roller shell to the outer surface thereof and is imparted to the thread. Owing to the good thermal conductivity of the roller shell no undesirable temperature gradients appears at the outer surface of the roller shell. The eddy current losses which are produced in the magnetically conducting portion of the roller may be kept very low by having the roller shell consist of a pack of thin rings of dynamo sheet. The heat development will then mainly be produced as a result of the electric currents induced in the conductors. Since these currents, contrary to eddy currents, flow along orderly directed paths, it is possible to measure their strength and thereby to obtain a measure of the amount of heat developed. The current strength may be measured with the aid of a fixedly mounted measuring coil which surrounds part of the magnetic field around the conductors or around one of the short-circuiting rings. This measuring coil is schematically drawn in FIGURE 1 and referred to by reference numeral 24. Since it may be fixedly mounted, no slip rings are required to pass on the measuring signal to the desired spot in the control system.

If it is assumed that the ambient temperature does not change or hardly varies over relatively long periods, the relation between the measured current and the final temperature of the roller shell for a given ambient temperature may be utilized for setting the temperature of the roller. Also, under this condition, use may be made of an automatic control loop so that the current strength may be controlled and kept at a constant value which corresponds to the desired roller temperature. The current strength may be influenced by varying the voltage and/or frequency of the polyphase source. To this end, use may also be made of a magnetic shunt, by which the active part of the rotating field may be set.

The rotatable parts of the transport roller may also be supported in bearings arranged in the manner shown in FIGURE 2. The bearing 6, which in the construction shown in FIGURE 1 is located in the bushing 8, is in the construction according to FIGURE 2 replaced by the bearing 25. The bushing 8′ is in this case formed integral with the flange 10′.

It will be clear that in the embodiments shown in FIGURES 1 and 2 a force couple is imposed on the roller shell 1 not only through the driving shaft 4 but also through the stator 18. When the directions of rotation of the roller shell and the rotating field are the same and, moreover, when the angular velocity of the rotating field is greater than that of the roller shell, then only part of the total driving couple required for rotating the roller shell will have to be imposed via the shaft 4.

Figure 3:
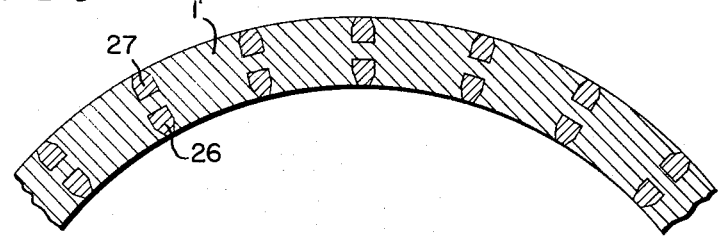
FIGURE 3 shows a variant construction of the roller shall of the transport roller shown in FIGURES 1 and 2.

When it is desired that the largest possible amount of the electric power fed to the stator should be converted into heat or if the force moment imposed by the stator on the roller shell is to be kept as low as possible, then the roller shell may be constructed as shown in FIGURE 3. In this figure an enlarged section of a roller shell 1′ is shown in a view taken along line III—III on FIGURE 1. In this modified construction both the inner and outer surfaces of the roller shell 1′ are provided with grooves in which rod-shaped conductors 26 and 27 are located. When the end of each inner conductor 26 is connected to the corresponding end of an adjacent outer conductor 27, then the stator can exert only a relatively low coupling force on the rotor, i.e., the shell 1′. For, the inner conductors 26 are in that case surrounded by a much greater magnetic flux than the outer conductors 27. Electric currents of approximately the same strength then flow in the inner and outer conductors, but in opposite directions, so that only a relatively low mechanical couple can be developed by the rotating magnetic field.

In FIGURE 4, reference numeral 18′ refers to the polyphase winding of stator 18, which is connected to a polyphase power source 30, e.g., a motor driven generator. A magnetic shunt 32, as heretofore described, controls the voltage and/or frequency of the power supplied to the polyphase winding 18′. The shunt comprises a member of a magnetically conductive material which, depending on its position relative to the stator, shunts a certain part of the magnetic field, such that this part is not surrounding the conductors. In his way, the currents induced in the conductors can be varied by altering the position of the shunt. Coupled to the shunt is a controller 34 which is connected to the current pick up 24. Controller 34 is set so that upon receiving a measuring signal from the pick up 24, a signal is sent to the magnetic shunt. The controller is set to ensure that a desired temperature is maintained in the transport roller shell.

When the measuring signal indicates that the temperature of the shell is too low, a signal transmitted to the shunt causes it to alter its position, hereby the voltage and/or frequency of the power supplied to the polyphase winding. Conversely, a signal also acts to reduce the voltage and/or frequency of the power when the temperature is too high. Thus the temperature of the roller can be maintained at a substantially constant preselected value, assuming the ambient temperature is substantially constant. Also, the apparatus of this invention provides an automatic control loop for regulating the temperature of the roller; the strength and/or angular velocity of the resulting active rotating magnetic field providing a correcting quantity for the heat evolved by the roller.

It will be appreciated that the aparatus of the invention may also include means for varying the output of the power source, e.g., the speed of a generator and that the polyphase winding used on stator 18 may be wired in a balanced delta connection or in a Y connection.

While the novel features of the invention have been shown and described and are pointed out in the appended claims, it is to be understood that various omissions, substitutions and changes in construction and arrangement of the features shown and described may be made by those skilled in the art without departing from the spirit and scope of the invention.

What is claimed is:

1. In a method of heating a continuously advancing thread-like product wherein the product is wrapped at least one turn around the heated casing of a transport-roller, the casing being heated by the heat evolved therein when a metal portion of the casing is moved through a magnetic field, thereby cutting the magnetic lines of force in that field, the improvement which comprises producing a rotating magnetic field, inducing electrical currents in the casing and forcing the induced currents to flow along orderly directed current paths within said casing.

2. A transport roller for continuously advancing and heating a thread-like product which comprises current inducing means capable of producing a rotating magnetic field; a product supporting casing spaced around and separated from said current inducing means by an air gap, said casing being so constructed that heat is evolved therein under the influence of the rotating magnetic field and containing material having good magnetic conductivity and low electric losses and non-magnetic material having electrical conductivity, the non-magnetic material comprising rod-shaped electrical conductors arranged around said inducing means, and each of said conductors being at least partially surrounded by the material having good conductivity and forming a portion of a shunted circuit; and at least one fixedly mounted current pick up positioned adjacent to said electrical conductors for supplying a signal representing the strength of the current induced in said conductors, the current pick up comprising a measuring coil which surrounds part of the magnetic flux set up by currents flowing through the shunted circuits.

3. The transport roller of claim 2 in which an automatic control loop is provided for controlling the temperature of the roller casing, the pick up of the controlled quantity in said loop being formed by the current pick up and the correcting quantity in said control loop being formed by the strength and/or the angular velocity of the rotating magnetic field.

4. A transport roller for continuously advancing and heating a thread-like product, comprising current inducing means capable of producing a rotating magnetic field, and a product supporting casing spaced around and separated from said current inducing means by an air gap, said casing being so constructed that heat is evolved therein under the influence of the rotating magnetic field, and containing material having good magnetic conductivity and low electric losses and non-magnetic material having electrical conductivity, the non-magnetic material comprising rod-shaped electrical conductors arranged around the inducing means, each of said conductors being at least partially surrounded by the material having good magnetic conductivity and forming a portion of a shunted circuit.

5. The transport roller of claim 4 in which the inner surface of the roller casing is provided with rod-shaped electrical conductors that extend substantially parallel to the axis of the roller.

6. The transport roller of claim 5, in which short-circuiting rings are provided to inter-connect the rod-shaped conductors at their ends.

7. The transport roller of claim 5, in which the geometrical axes of half of the rod-shaped conductors lie on one of two co-axial cylindrical surfaces and adjacent pairs of conductors are combined to form shunted circuits which lie in planes that pass through the axis of the transport roller.

8. The transport roller of claim 4, in which the material having good magnetic conductivity is made of a pack of ring-shaped dynamo laminations which are insulated from each other.

9. The transport roller of claim 4 in which means are provided for varying the strength of the rotating magnetic field.

10. The transport roller of claim 9, in which a magnetic shunt is provided for varying the strength of the magnetic rotating field.

11. The transport roller of claim 4, in which said inducing means includes a polyphase winding.

12. The transport roller of claim 11, in which the voltage applied to the polyphase winding is variable.

13. The transport roller of claim 11, in which the frequency of the voltage applied to the polyphase winding is variable.

14. The transport roller of claim 4, in which at least one fixedly mounted current pick up is provided for supplying a signal representing the strength of the current induced in the rod-shaped electrical conductors.

References Cited

UNITED STATES PATENTS

| 3,187,150 | 6/1965 | France | 219—10.61 |
| 3,200,230 | 8/1965 | De La Bretonière | 219—10.61 X |

FOREIGN PATENTS

| 858,855 | 1/1961 | Great Britain. |
| 1,454,363 | 8/1966 | France. |

RICHARD M. WOOD, *Primary Examiner.*

L. H. BENDER, *Assistant Examiner.*

U.S. Cl. X.R.

219—471